United States Patent
Pier (12)

(10) Patent No.: US 6,455,162 B1
(45) Date of Patent: Sep. 24, 2002

(54) COATINGS AGENT AND THE USE THEREOF

(75) Inventor: Peter Pier, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/720,213

(22) PCT Filed: Jun. 17, 1999

(86) PCT No.: PCT/EP99/04179

§ 371 (c)(1),
(2), (4) Date: Dec. 21, 2000

(87) PCT Pub. No.: WO00/00554

PCT Pub. Date: Jan. 6, 2000

(30) Foreign Application Priority Data

Jun. 30, 1998 (DE) .......................... 198 29 163

(51) Int. Cl.⁷ .............................................. B32B 27/36
(52) U.S. Cl. ....................................................... 428/412
(58) Field of Search ......................................... 428/412

(56) References Cited

U.S. PATENT DOCUMENTS

| 3,738,956 A | 6/1973 | Glatti et al. .............. 260/41 R |
| 3,865,619 A | 2/1975 | Pennewiss et al. ...... 117/138.8 |
| 4,478,909 A | 10/1984 | Taniguchi et al. .......... 428/331 |
| 4,576,864 A | 3/1986 | Krautter et al. ............. 428/328 |

FOREIGN PATENT DOCUMENTS

| JP | 51-006193 | 1/1976 |
| JP | 51-081877 | 7/1976 |
| WO | 96/18691 | 6/1996 |
| WO | 98/03607 | 1/1998 |

OTHER PUBLICATIONS

Patent Abstracts of Japan, vol. 097, No. 003, Mar. 31, 1997, & JP 08 292301 A (Nissan Motor Co Ltd), Nov. 5, 1996, Zusammenfassung, Seite 3.

Patent Abstracts of Japan, vol. 011, No. 080 (C–409), Mar. 11, 1987, & JP 61 235468 A (Kashiyuu KK), Oct. 20, 1986, Zusammenfassung.

*Primary Examiner*—Terressa M. Boykin

(57) ABSTRACT

A coating agent and its use in the preparation of a transparent water spreading coating on thermoplastic or glass moldings are disclosed. The agent that is characterized in that its pH is below 6 features excellent adhesive and mechanical strengths. It comprises sulfodicarboxylic acid diester, at least one water-insoluble oxide of metal or semi-metal and an acid/water mixture.

15 Claims, No Drawings

COATINGS AGENT AND THE USE THEREOF

CROSS REFERENCE TO RELATED PATENT APPLICATIONS

The present patent application claims the right of priority under 35 U.S.C. §119 (a)-(d) and 35 U.S.C. §365 of International Application No. PCT/EP99/04179, filed 17 June 1999, which was published in German as International Patent Publication No. WO 00/00554 on 6 January 2000, which is entitled to the right of priority of German Patent Application No. 198 29 163.9, filed Jun. 30, 1998.

FIELD OF THE INVENTION

The present invention relates to coating agents and to their use for the preparation of transparent water-spreading coatings on thermoplastic or glass mouldings.

BACKGROUND OF THE INVENTION

The term "water-spreading" is understood as meaning the property of a surface to form a contact angle of less than 20 degrees with a drop of water placed thereon. Accordingly, a water-spreading coating is a coating which confers this property on a surface.

Mouldings with a water-spreading surface have the property whereby water which comes into contact with its surface does not contract to mutually separate drops on said surface, but the drops spread and, when touched, coalesce to a continuous film. This gives rise to an improved luminous reflectance on the water-wetted surface and a better transparency in the case of translucent mouldings. Also, water cannot so easily drip from the underside of the moulding. These properties of inhibiting drop formation, or so-called antidrop properties, are in demand especially for various glazing materials made of inorganic glasses (hereafter abbreviated to glass) or thermoplastics. It is desirable in these cases that the condensation water or rain water deposited thereon should not fall off in drops, but that, following the slope of the material, it should run off at the lower edge in a continuous film or at least in coherent streaks.

The opposite behaviour to that of a water-spreading surface is shown by a water-repellent surface. On water-repellent surfaces, water which comes into contact with such a surface contracts to mutually separate drops.

Numerous attempts to provide water-repellent plastic surfaces with water-spreading layers have been reported in the literature. According to DE-A 21 61 645, such coatings are produced from a copolymer of alkyl esters, hydroxyalkyl esters and quaternary aminoalkyl esters of acrylic or methacrylic acid and methylol ethers of methacrylamide as crosslinking agents. They initially take up water, with swelling, and gradually change to a water-spreading state. As a result of the swelling, however, the coating becomes soft and sensitive to mechanical damage.

To improve the mechanical strength of water-spreading coatings, inorganic constituents such as colloidal metal oxides, especially aluminium oxide, or colloidal silicon dioxide were incorporated into the coating compounds (EP-A 7 681 877 or EP-A 7 606 193).

To achieve a higher mechanical resistance, coatings were developed with hydrophilic inorganic constituents in a hydrophilic binder. According to JP-A 76 81 877, polyvinyl chloride sheets or polymethyl methacrylate sheets are covered with a coating of colloidal aluminium oxide as a hard ingredient for conferring hydrophilicity and polyvinyl alcohol and ammonium polyacrylate as binders. Again, however, this coating is sensitive to mechanical stresses in the water-swollen state.

Attempts have even been made to incorporate wetting agents into the plastic material from which the moulding is produced. Thus, according to DE-A 2 017 002, water-spreading coverings for greenhouses and similar moist enclosures are made of a plastic containing surface-active agents like polyalkylene glycol. The water-spreading action of this additive is inadequate and the weather resistance of the plastic is also impaired.

JP-A 76 06 193 has proposed, as glazing means, polymethacrylate panels with a coating of 95 parts of colloidal silicon dioxide and 5 parts of a dispersion of a hydrophobic acrylic resin. However, the adhesion of this coating is wholly unsatisfactory, especially in the wet state.

According to EP-A 51 405, the adhesion of a water-spreading coating on plastic mouldings is improved with a coating made up of two layers, both layers containing colloidal silicon dioxide, a partially hydrolyzed polysiloxane and polyvinyl alcohol as a binder. The ratio of silicon to carbon is greater in the bottom layer than in the top layer.

It can be established in general terms that although a coating with good water spreading can usually be obtained with strongly hydrophilic coating materials, the coating is normally too soft in the swollen state. If one wants to counteract this disadvantage through stronger crosslinking or lower hydrophilicity, the water-spreading action is impaired along with the mechanical sensitivity. Although silicon dioxide and various other metal or semimetal oxides combine the advantages of high hardness and good wettability by water without swelling, they have the disadvantage of not adhering at all.

The greater the amount of binder used to anchor the oxides to the plastic surface, the more the wettability of the oxides and the hence the water-spreading action of the coating are impaired and the more the disadvantages of the binders become apparent: mechanical sensitivity in the case of hydrophilic binders and inadequate water spreading in the case of hydrophobic binders.

DE-A 34 00 079 has proposed creating a strong adhesive bond between the water-repellent surface of a plastic moulding and a water-spreading layer essentially consisting entirely of silicon dioxide or other metal oxides of colloidal particle size, which itself has an inadequate adhesive strength on the plastic layer, by means of a coupling layer of a water-insoluble and essentially non-swellable organic polymer with polar groups.

The use of this coupling layer or other so-called primer layers in order to improve the bond between the water-spreading layer and the plastic surface requires an additional step in the coating process, making the manufacture of coated mouldings more complicated and more expensive.

SUMMARY OF THE INVENTION

All the coating agents mentioned have the disadvantage that they have to be applied from organic solvents.

The object of the present invention is to provide coating agents which are suitable for the preparation of transparent water-spreading coatings on mouldings and which have an excellent adhesive strength without a coupling layer, together with a high mechanical strength.

According to the invention, this object is achieved by the provision of a coating agent containing A) 0.005 to 2 parts by weight of a compound represented by general formula (1):

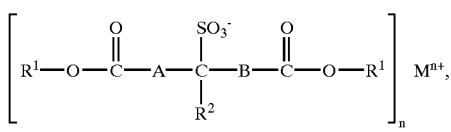

wherein
R$^1$ is a hydrocarbon radical having 1 to 30 C atoms,
R$^2$ is hydrogen or a hydrocarbon radical having 1 to 6 C atoms,
A is a single bond or a divalent hydrocarbon radical having 1 to 30 C atoms.
B is a single bond or a divalent hydrocarbon radical having 1 to 30 C atoms,
n is 1,2,3 or 4 and
M$^{n+}$ is a cation with n positive charges, B) 1 to 20 parts by weight of a water-insoluble oxide or several water-insoluble oxides of a metal or semimetal, and C) 80 to 100 parts by weight of an acid/water mixture comprising more than 90% of water, with the proviso that the pH of the coating agent is below 6, said coating agent being a subject of the invention.

The present invention also provides the use of the coating agents according to the invention for the preparation of transparent water-spreading coatings on mouldings of any kind, preferably on thermoplastic or glass mouldings.

DETAILED DESCRIPTION OF THE INVENTION

Transparent water-spreading coatings can be prepared on mouldings from the coating agents according to the invention. The coatings have an excellent adhesive strength together with a high mechanical strength. Coupling layers are not required. A further advantage of the coating agents according to the invention is that they contain predominantly water and hence only small amounts of organic solvents, thereby affording economic and ecological advantages.

The compounds represented by general formula (1), which are used as component A of the coating agent according to the invention, are sulfodicarboxylic acid diesters. These are used either as the free acid (i.e. n=1 and M$^{n+}$=H$^+$) or as salts. If salts are used, they can be the salts of any cations. Examples which may be mentioned are cations of elements, cations of organic or inorganic molecules or cations of organic or inorganic complexes. It is also possible to use mixtures of different cations.

Preferred compounds of general formula (1) are those represented by general formula (2):

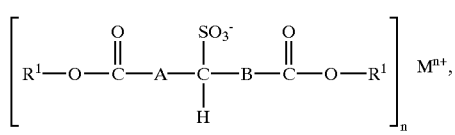

wherein
R$^1$ is an aliphatic hydrocarbon radical having 1 to 30 C atoms,
A is a single bond or a divalent aliphatic hydrocarbon radical having 1 to 3 C atoms,
B is a single bond or a divalent aliphatic hydrocarbon radical having 1 to 3 C atoms,
n is 1 or 2 and
M$^{n+}$ is a cation with n positive charges.

Particularly preferred compounds of general formula (1) are those represented by general formula (3):

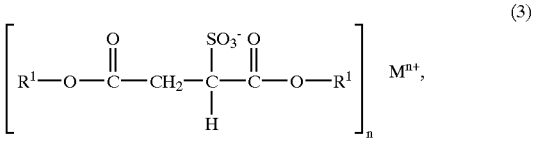

wherein
R$^1$ is an aliphatic hydrocarbon radical having 1 to 30 C atoms,
n is 1 or 2 and
M$^{n+}$ is a cation with n positive charges.

Alkali metal salts, alkaline earth metal salts or mixtures thereof are preferred among these compounds. Alkali metal salts are very particularly preferred. The sodium salt of bis(2-ethylhexyl) sulfosuccinate may be mentioned as an example.

The compounds represented by general formula (1) can be prepared by a known process. Some of them are commercially available.

To prepare the coating agents, the compounds represented by general formula (1) can be used as the pure substance or as a solution in any solvent or solvent mixture. They are preferably used as a solution. For example, it is possible to use the commercial product Dapro® U99 from Daniel Products Company, Inc., New Jersey, USA. This is a solution of 40 g of the sodium salt of bis(2-ethylhexyl) sulfosuccinate in 43 g of 2-butoxyethanol, 4 g of ethanol, 3 g of water and 10 g of polyethylene glycol fatty acid ester (a mixture based essentially on polyethylene glycol oleate, polyethylene glycol palmitate and polyethylene glycol stearate).

If the compound represented by general formula (1) is used as a solution to prepare the coating agent according to the invention, this has the consequence that the coating agent contains additional substances, namely the solvents for the solution of the compound represented by general formula (1), over and above said three components A, B and C. The solution of the compound represented by general formula (1) should preferably have a concentration of 5 to 95 wt. %, particularly preferably 10 to 90% and very particularly preferably 20 to 60%.

Oxides of elements of main group 3 or 4 or subgroup 2, 3, 4, 5, 6, 7 or 8 of the periodic table of the elements are preferably used as water-insoluble metal or semimetal oxides according to the invention. Examples which may be mentioned are aluminium oxide, silicon dioxide, titanium oxide, cerium oxide, zinc oxide, tin oxide, chromium oxide, indium oxide, zirconium oxide and iron oxides, as well as pigments, especially transparent pigments. The oxides according to the invention can contain small amounts of other elements as doping agents.

It is particularly preferable to use oxides of a metal or semimetal of main group 3 or 4 of the periodic table of the elements. Examples which may be mentioned are aluminium oxide or silicon oxide.

It is very particularly preferable to use oxides of a metal or semimetal of main group 4 of the periodic table of the elements. Of these, silicon dioxide is the most preferred.

The metal or semimetal oxides according to the invention are preferably used as a sol, i.e. as an aqueous colloidal solution, which preferably has a metal oxide concentration of 10 to 50 wt. % and whose particles preferably have a mean diameter of less than 5 μm.

In the sol according to the invention, the oxide particles preferably have a mean size of less than 200 nm, particularly preferably in the range 5 to 100 nm. The particle size is determined by means of an ultracentrifuge.

The acid/water mixture according to the invention comprises more than 90% of water. It preferably comprises more than 95% and particularly preferably more than 98% of water. It can contain organic or inorganic acids. It is preferable to use weak acids. Weak acids are those with a $pK_a$ greater than 2. It is particularly preferable to use aliphatic carboxylic acids and very particularly preferable to use acetic acid.

The coating agent according to the invention contains 0.005 to 2 parts by weight, preferably 0.01 to 0.5 part by weight and particularly preferably 0.05 to 0.4 part by weight, of component A.

The coating agent according to the invention contains 1 to 20 parts by weight, preferably 2 to 20 parts by weight and particularly preferably 3 to 8 parts by weight, of component B.

The coating agent according to the invention has a pH below 6, preferably below 5.

The coating agents according to the invention can optionally contain other components, e.g. surfactants and organic solvents to improve the wetting of the substrate, and flow control agents or antifoams.

The coating agents according to the invention are preferably prepared by preparing the sol of the appropriate metal or semimetal oxide in water or diluting a commercially available sol with water to the desired concentration in the coating agent according to the invention, then advantageously adjusting the pH to a weakly acidic value, for example by the addition of acetic acid, and adding the appropriate amount of component A of the coating agent according to the invention.

Advantageously the coating agent, and optionally also the metal or semimetal oxide sol which may be used, are filtered to give a composition which only contains particles with a diameter preferably of less than 5 μm.

The coating agents according to the invention can be applied to the mouldings to be coated by any of the known processes, for example by brushing, casting, rolling, spraying or any other known method. Mouldings can also be coated by immersion in the aqueous coating agents according to the invention, this procedure being particularly suitable for mouldings with cavities, e.g. bridged double panels, because in this way the mouldings can also be coated from inside.

To prepare the transparent water-spreading coating on the mouldings without a coupling layer, the applied coating agent according to the invention is dried and baked at elevated temperature, preferably at 90 to 155° C. and particularly preferably at 110 to 135° C. The duration of this drying and baking step depends on the amount of applied coating agent according to the invention and, if necessary, can be ascertained by those skilled in the art by means of simple experiments.

The coating agents according to the invention are applied to the mouldings to be coated in amounts preferably of 3 to 15 g/m² and particularly preferably of 6 to 12 g/m². The coating of a plastic moulding with a coating agent according to the invention can take place after or actually during the manufacture of said moulding.

The coating agents according to the invention are suitable for coating mouldings of any kind. It is preferable to use glass mouldings. It is also preferable to use thermoplastic mouldings, said thermoplastics preferably being transparent. These mouldings are made especially of polymethyl methacrylate, polystyrene, polyvinyl chloride, polyester or polycarbonate, preferably polycarbonate.

Thermoplastics suitable for coating are described for example in Becker/Braun, Kunststoff-Handbuch (Plastics Handbook), Carl Hanser Verlag, Munich, Vienna. The plastics can contain additives.

In particular, according to the invention, any polycarbonate can be coated.

Polycarbonates suitable according to the invention are both homopolycarbonates and copolycarbonates. It is also possible to use a mixture of the polycarbonates suitable according to the invention.

The polycarbonates can be partially or completely replaced with aromatic polyester-carbonates.

The polycarbonates can also contain polysiloxane blocks. Their preparation is described for example in U.S. Pat. No. 3,821,315, U.S. Pat. No. 3,189,662 and U.S. Pat. No. 3,832,419.

Preferred polycarbonates are those based on the bisphenols of general formula (4):

HO—Z—OH (4)

wherein Z is a divalent organic radical having 6 to 30 C atoms and containing one or more aromatic groups.

Examples of bisphenols of general formula (4) are those belonging to the following groups:

dihydroxybiphenyls, bis(hydroxyphenyl)alkanes, bis(hydroxyphenyl)cycloalkanes, bis(hydroxyphenyl)sulfides, bis(hydroxyphenyl)ethers, bis(hydroxyphenyl)ketones, bis(hydroxyphenyl)sulfones, bis(hydroxyphenyl)sulfoxides and α,α'-bis(hydroxyphenyl)diisopropylbenzenes.

Derivatives of said bisphenols, obtainable for example by alkylation or halogenation on their aromatic rings, are further examples of bisphenols of general formula (4).

The following compounds in particular are examples of bisphenols of general formula (4):

hydroquinone, resorcinol, 4,4'-dihydroxybiphenyl, bis(3,5-dimethyl-4-hydroxyphenyl)methane, bis(3,5-dimethyl-4-hydroxyphenyl)sulfone, 1,1-bis(3,5-dimethyl-4-hydroxyphenyl)-p/m-diisopropylbenzene, 1,1-bis(4-hydroxyphenyl)-1-phenylethane, 1,1-bis(3,5-dimethyl-4-hydroxyphenyl)cyclohexane, 1,1-bis(4-hydroxyphenyl)-3-methylcyclohexane, 1,1-bis(4-hydroxyphenyl)-3,3-dimethylcyclohexane, 1,1-bis(4-hydroxyphenyl)-4-methylcyclohexane, 1,1-bis(4-hydroxyphenyl)cyclohexane, 1,1-bis(4-hydroxyphenyl)-3,3,5-trimethylcyclohexane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)propane(i.e. bisphenol A), 2,2-bis(3-chloro4-hydroxyphenyl)propane,
2,2-bis(3,5-dibromo-4-hydroxyphenyl)propane,
2,4-bis(4-hydroxyphenyl)-2-methylbutane,
2,4-bis(3,5-dimethyl-4-hydroxyphenyl)-2-methylbutane,
α,α'-bis(4-hydroxyphenyl)-o-diisopropylbenzene,
α,α'-bis(4-hydroxyphenyl)-m-diisopropylbenzene (i.e. bisphenol M) and
α,α'-bis(4-hydroxyphenyl)-p-diisopropylbenzene.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on bisphenol A and 1,1-bis(4-hydroxyphenyl)-3,3,5-trimethylcyclohexane.

The described bisphenols of general formula (4) can be prepared by known processes, e.g. from the corresponding phenols and ketones.

Processes for the preparation of said bisphenols are described for example in the monograph by H. Schnell, "Chemistry and Physics of Polycarbonates", Polymer Reviews, volume 9, pp. 77–98, Interscience Publishers, New York, London, Sydney, 1964, in U.S. Pat. No. 3,028,635, U.S. Pat. No. 3,062,781, U.S. Pat. No. 2,999,835, U.S. Pat. No. 3,148,172, U.S. Pat. No. 2,991,273, U.S. Pat. No. 3,271,367, U.S. Pat. No. 4,982,014, U.S. Pat. No. 2,999,846, DE-A 1 570 703, DE-A 2 063 050, DE-A 2 036 052, DE-A 2 211 956, DE-A 3 832 396 and FR-A 1 561 518 and in the Japanese Offenlegungsschriften with the application numbers 62039/1986, 62040/1986 and 105550/1986.

The preparation of 1,1-bis(4-hydroxyphenyl)-3,3,5-trimethylcyclohexane is described e.g. in U.S. Pat. No. 4,982,014.

Polycarbonates can be prepared by known processes. Suitable processes for the preparation of polycarbonates are for example the preparation from bisphenols with phosgene by the phase boundary process, from bisphenols with phosgene by the homogeneous phase process, or so-called pyridine process, or from bisphenols with carbonic acid esters by the melt transesterification process. These preparative processes are described e.g. in H. Schnell, "Chemistry and Physics of Polycarbonates", Polymer Reviews, volume 9, pp. 31–76, Interscience Publishers, New York, London, Sydney, 1964. Said preparative processes are also described in D. Freitag, U. Grigo, P. R. Müller, H. Nouvertne, "Polycarbonates" in Encyclopedia of Polymer Science and Engineering, volume 11, second edition, 1988, pages 648 to 718, and in U. Grigo, K. Kirchner and P. R. Müller, "Polycarbonates" in Becker/Braun, Kunststoff-Handbuch (Plastics Handbook), volume 3/1, Polycarbonates, Polyacetals, Polyesters, Cellulose esters, Carl Hanser Verlag, Munich, Vienna, 1992, pages 117 to 299.

The melt transesterification - process is described especially in H. Schnell, "Chemistry and Physics of Polycarbonates", Polymer Reviews, volume 9, pp. 44–51, Interscience Publishers, New York, London, Sydney, 1964, and in DE-A 1 031 512, U.S. Pat. No. 3 022 272, U.S. Pat. No. 5 340 905 and U.S. Pat. No. 5 399 659.

Examples of carbonic acid diesters which can be used to prepare polycarbonates by the melt transesterification process are carbonic acid diaryl esters, each of the two aryl radicals preferably having 6 to 14 C atoms. It is preferable to use carbonic acid diesters based on phenol or alkyl-substituted phenols, examples being diphenyl carbonate or dicresyl carbonate.

The polycarbonates suitable according to the invention preferably have a weight-average molecular weight ($\overline{M}_w$) of 10,000 to 200,000 g/mol, which can be determined e.g. by ultracentrifugation or light scattering. Particularly preferably, they have a weight-average molecular weight of 12,000 to 80,000 g/mol.

The average molecular weight of the polycarbonates according to the invention can for example be adjusted in known manner by using an appropriate amount of chain stoppers.

Both monophenols and monocarboxylic acids are suitable chain stoppers. Examples of suitable monophenols are phenol, p-chlorophenol, p-tert-butylphenol, cumylphenol or 2,4,6-tribromophenol, as well as long-chain alkylphenols, e.g. 4-(1,1,3,3-tetramethylbutyl)phenol, or monoalkylphenols or dialkylphenols having a total of 8 to 20 C atoms in the alkyl substituents, e.g. 3,5-ditert-butylphenol, p-tert-octylphenol, p-dodecylphenol, 2-(3,5-dimethylheptyl)phenol or 4-(3,5-dimethylheptyl)phenol. Suitable monocarboxylic acids are benzoic acid, alkylbenzoic acids and halogenobenzoic acids.

Preferred chain stoppers are phenol, p-tert-butylphenol, 4-(1,1,3,3-tetramethylbutyl)phenol and cumylphenol.

The amount of chain stoppers is preferably between 0.5 and 10 mol. %, based on the sum of the particular bisphenols used.

The polycarbonates suitable according to the invention can be branched in known manner, preferably through the incorporation of trifunctional or more than trifunctional branching agents. Examples of suitable branching agents are those with three or more than three phenolic groups or those with three or more than three carboxylic acid groups.

Examples of suitable branching agents are phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, hexa(4-(4-hydroxyphenylisopropyl)phenyl)terephthalate, tetra(4-hydroxyphenyl)methane, tetra(4-(4-hydroxyphenylisopropyl)phenoxy)methane and 1,4-bis(4',4"-dihydroxytriphenyl)methylbenzene, as well as 2,4-dihydroxybenzoic acid, trimesic acid, cyanuric chloride, 3,3-bis(3-methyl-4-hydroxyphenyl)-2-oxo-2,3-dihydroindole, trimesic acid trichloride and α,α,α"-tris(4-hydroxyphenol)-1,3,5-triisopropylbenzene.

Preferred branching agents are 3,3-bis(3-methyl-4-hydroxyphenyl)-2-oxo-2,3-dihydroindole and 1,1,1-tris(4-hydroxyphenyl)ethane.

The amount of branching agents, if used, is preferably 0.05 mol. % to 2 mol. %, based on moles of bisphenols used.

In the case where the polycarbonate is prepared by the phase boundary process, for example, the branching agents can be placed with the bisphenols and the chain stoppers in the aqueous-alkaline phase, or dissolved in an organic solvent and added together with the carbonic acid derivatives. In the case of the transesterification process, the branching agents are preferably metered in together with the dihydroxy-aromatic compounds or bisphenols.

To modify the properties, conventional additives can be admixed to the polycarbonates according to the invention and/or applied to the surface of the mouldings. Examples of conventional additives are fillers, reinforcing agents, stabilizers (for example UV stabilizers, heat stabilizers, gamma ray stabilizers), antistatic agents, flow aids, mould release agents, fire retardants, dyes and pigments. The additives mentioned and other suitable additives are described for example in Gächter, Müller, Kunststoff-Additive (Additives for Plastics), 3rd edition, Hanser-Verlag, Munich, Vienna, 1989.

Other polymers can be admixed to the polycarbonates according to the invention to give so-called polymer blends. For example, blends can be prepared from the polycarbonates according to the invention and polyolefins, especially ABS polymers.

The coating agents according to the invention and the mouldings coated therewith can be used for example for the manufacture of window panes, e.g. for greenhouses.

The invention is illustrated in greater detail in the Examples below.

Preparation of the Coating Agents

Coating Agent A 83.3 g of silica sol (Levasil® 300F from Bayer AG), which has previously been passed through a 5 µm filter, are added to 416.7 g of deionized water, with stirring. The aqueous suspension is then adjusted to a pH of 4.8 with 98% acetic acid, and 1.5 g of Dapro® U99 (a solution of 40 g of the sodium salt of bis(2-ethylhexyl)sulfosuccinate in 43 g of 2-butoxyethanol, 4 g of ethanol, 3 g of water and 10 g of polyethylene glycol fatty acid ester (a mixture based essentially on polyethylene glycol oleate, polyethylene glycol palmitate and polyethylene glycol stearate)) are added.

Levasil® 300F is an anionically stabilized silica sol from Bayer AG with a mean particle size of 7 to 8 nm and a specific surface area of 300 m²/g. Levasil® 300F has a solids content of 30 wt. % and a pH of approx. 9.8. It contains a small amount of formaldehyde, ≦0.2 wt. %, to combat attack by microorganisms.

Coating Agent B

This is prepared analogously to coating agent A. However, the Dapro® U99 is replaced with 0.675 g of the sodium salt of bis(2-ethylhexyl)sulfosuccinate in 0.825 g of 2-butoxyethanol.

Coating Agent C

This is prepared analogously to coating agent A. However, the indicated solution is replaced with 0.621 g of the sodium salt of bis(2-ethylhexyl)sulfosuccinate and 0.054 g of polyethylene glycol (number-average molecular weight: 1000) in 0.754 g of 2-butoxyethanol and 0.0705 g of ethanol.

Coating Agent D

This is prepared analogously to coating agent C. The polyethylene glycol is replaced with 0.062 g of polyethylene glycol fatty acid ester (a mixture based essentially on polyethylene glycol oleate, polyethylene glycol palmitate and polyethylene glycol stearate).

Coating of Polycarbonate Cellular Sheets

Cellular sheets of a branched aromatic polycarbonate (relative solution viscosity of 1.315, measured on a solution of 0.5 g of polycarbonate in 100 ml of methylene chloride at room temperature), such as those used for greenhouse construction, were coated on one side with each of coating agents A to D by the flow coating process and then dried at 130° C. for 0.5 h. The layer thicknesses were approx. 0.3 µm (ETA-SD-30 thickness meter from ETA-Optik; interference method). The coatings had no surface defects and showed no interference patterns. Wetting with water was uniform. The contact angle of the water was below 1°.

Steam Test (100° C.)

The steam test was carried out as a further test, the cellular sheets being exposed to a closed steam atmosphere at 100° C. The point at which the water-spreading effect disappears and drop formation first takes place is noted.

Result:

|  | Coating agent | Life of the coating in the steam test |
| --- | --- | --- |
| Example | A | over 3 hours |
| Comparative Example | copolyacrylate/silica sol | 30 minutes |

In the case of the Comparative Example, distinct separation of the coating could be observed after 30 minutes, accompanied by a brownish discolouration of the drops of water.

Model Greenhouse Test

The coated polycarbonate cellular sheets were fixed to the roof of a model greenhouse at an angle of 60°, with the coated side facing downwards, so that the water-spreading action could be compared by observation of the droplet formation. Using a heat source, water was vaporized in the model greenhouse to create a temperature of 50° C. and an atmospheric humidity of 100%.

The sheets were left under these conditions for 6 h and then heated in a dry heating cabinet for 4 h at 40° C. The model greenhouse and heating cabinet procedures were then repeated alternately until the water-spreading effect disappeared (visible by the drop formation on the sheet).

By way of comparison, three commercially available polycarbonate cellular sheets treated with a water-spreading coating, such as those used for greenhouse construction, were tested concomitantly.

Result:

|  | Coating | Life of the coating (in cycles) |
| --- | --- | --- |
| Example 1 | A | >80 |
| Example 2 | B | >80 |
| Example 3 | C | >80 |
| Example 4 | D | >80 |
| Comparative Example 5 | copolyacrylate/silica sol | >80 |
| Comparative Example 6 | polyvinylpyrrolidone/silica sol | 15 |
| Comparative Example 7 | surfactant/silica sol | 15 |

What is claimed is:

1. A coating agent consisting essentially of:
   A) 0.005 to 2 parts by weight of a compound represented by general formula (1):

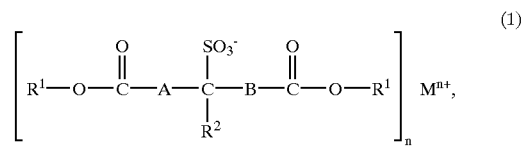

wherein

R$^1$ is a hydrocarbon radical having 1 to 30 C atoms,

R$^2$ is hydrogen or a hydrocarbon radical having 1 to 6 C atoms,

A is a single bond or a divalent hydrocarbon radical having 1 to 30 C atoms,

B is a single bond or a divalent hydrocarbon radical having 1 to 30 C atoms, n is 1, 2, 3 or 4 and $M^{n+}$ is a cation with n positive charges, B) 1 to 20 parts by weight of a water-insoluble oxide or several water-in-soluble oxides of a metal or semimetal, and C) 80 to 100 parts by weight of a weak acid/water mixture comprising more than 90% of water, said weak acid having a $pK_a$ of greater than 2, with the proviso that the pH of the coating agent is below 6.

2. A coating agent consisting essentially of:

A) 0.005 to 2 parts by weight of a compound represented by general formula (2):

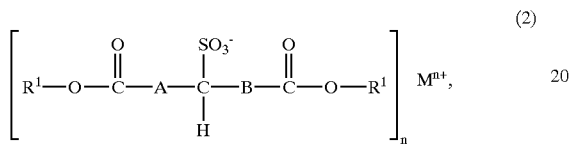

wherein $R^1$ is an aliphatic hydrocarbon radical having 1 to 30 C atoms,

A is a single bond or a divalent aliphatic hydrocarbon radical having 1 to 3 C atoms, B is a single bond or a divalent aliphatic hydrocarbon radical having 1 to 3 C atoms, n is 1 or 2 and $M^{n+}$ is a cation with n positive charges, B) 1 to 20 parts by weight of a water-insoluble oxide or several water-in-soluble oxides of a metal or semimetal of main group 3 or 4 or subgroup 2, 3, 4, 5, 6, 7 or 8 of the periodic table of the elements, and C) 80 to 100 parts by weight of a weak acid/water mixture comprising more than 90% of water, said weak acid having a $pK_a$ of greater than 2, with the proviso that the pH of the coating agent is below 6.

3. A coating agent consisting essentially of:

A) 0.005 to 2 parts by weight of a compound represented by general formula (3):

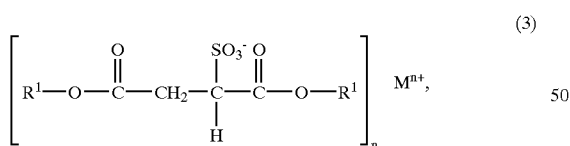

wherein $R^1$ is an aliphatic hydrocarbon radical having 1 to 30 C atoms, n is 1 or 2 and $M^{n+}$ is a cation with n positive charges, B) 1 to 20 parts by weight of a sol of a water-insoluble oxide or several water-insoluble oxides of a metal or semimetal of main group 3 or 4 of the periodic table of the elements, and C) 80 to 100 parts by weight of a weak acid/water mixture comprising more than 90% of water, said weak acid having a $pK_a$ of greater than 2, with the proviso that the pH of the coating agent is below 6.

4. A coating agent consisting essentially of:

A) 0.005 to 2 parts by weight of a compound represented by general formula (3):

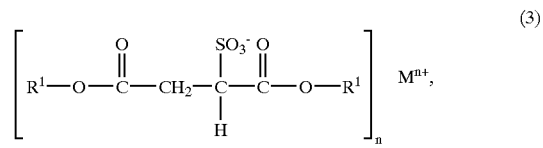

wherein $R^1$ is an aliphatic hydrocarbon radical having 1–30 C atoms, n is 1 or 2 and $M^{n+}$ is an alkali metal cation (for n=1) or an alkaline earth metal cation (for n=2), B) 1 to 20 parts by weight of a sol of a water-insoluble oxide of a metal or semimetal of main group 3 or 4 of the periodic table of the elements, and C) 80 to 100 parts by weight of a weak acid/water mixture comprising more than 90% of water, said weak acid having a $pK_a$ of greater than 2, with the proviso that the pH of the coating agent is below 6.

5. A coating agent consisting essentially of:

A) 0.005 to 2 parts by weight of a compound represented by general formula (5):

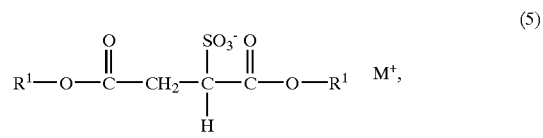

wherein $R^1$ is an aliphatic hydrocarbon radical having 1–30 C atoms and $M^{n+}$ is an alkali metal cation, B) 1 to 20 parts by weight of a sol of a water-insoluble oxide of a metal or semimetal of main group 4 of the periodic table of the elements, and C) 80 to 100 parts by weight of a weak acid/water mixture comprising more than 90% of water, said weak acid having a $pk_a$ of greater than 2, with the proviso that the pH of the coating agent is below 6.

6. A coated glass molding comprising a transparent, water-spreading coating comprising the agent of claim 1.

7. A thermoplastic molding comprising a transparent, water spreading coating comprising the agent of claim 1.

8. A transparent thermoplastic molding comprising a transparent, water spreading coating comprising the agent of claim 1.

9. A thermoplastic molding comprising a transparent, water-spreading coating comprising the agent of claim 1, wherein thermoplastic is a member selected from the group consisting of polymethylmethacrylate, polystyrene, polyvinylchloride, polyester and polycarbonate.

10. The thermoplastic molding of claim 9 wherein the member is polycarbonate.

11. The coating agent of claim 1 wherein said compound represented by general formula (1) is sodium bis(2-ethylhexyl)sulfosuccinate.

12. The coating agent of claim 1 wherein B) is silicon dioxide.

13. The coating agent of claim 1 wherein the weak acid of C) is an aliphatic carboxylic acid.

14. The coating agent of claim 13 wherein the weak acid of C) is acetic acid.

15. The coating agent of claim 1 wherein said compound represented by general formula (1) is sodium bis(2-ethylhexyl)sulfosuccinate, B) is silicon dioxide, and the weak acid of C) is acetic acid.

* * * * *

UNITED STATES PATENT AND TRADEMARK OFFICE
CERTIFICATE OF CORRECTION

PATENT NO.    : 6,455,162 B1
DATED         : September 24, 2002
INVENTOR(S)   : Peter Bier It is certified that error appears in the above-identified patent and that said Letters Patent is hereby corrected as shown below:

<u>Title page,</u>
Item [75], Inventor, replace "Peter Pier, Krefeld (DE)" with -- Peter Bier, Krefeld (DE) --.

Signed and Sealed this

Tenth Day of February, 2004

JON W. DUDAS
*Acting Director of the United States Patent and Trademark Office*